(12) United States Patent
Alabbasi et al.

(10) Patent No.: US 12,342,347 B2
(45) Date of Patent: Jun. 24, 2025

(54) CONFIGURED GRANT TIMER IN INTRA-USER EQUIPMENT MULTIPLEXING

(71) Applicant: Telefonaktiebolaget LM Ericsson (PUBL), Stockholm (SE)

(72) Inventors: Abdulrahman Alabbasi, Kista (SE); Zhenhua Zou, Solna (SE); Henrik Enbuske, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 657 days.

(21) Appl. No.: 17/598,596

(22) PCT Filed: Mar. 25, 2020

(86) PCT No.: PCT/EP2020/058376
§ 371 (c)(1),
(2) Date: Sep. 27, 2021

(87) PCT Pub. No.: WO2020/193638
PCT Pub. Date: Oct. 1, 2020

(65) Prior Publication Data
US 2022/0159708 A1    May 19, 2022

Related U.S. Application Data

(60) Provisional application No. 62/825,728, filed on Mar. 28, 2019.

(51) Int. Cl.
*H04W 72/23*    (2023.01)
*H04L 1/1812*    (2023.01)

(52) U.S. Cl.
CPC .......... *H04W 72/23* (2023.01); *H04L 1/1812* (2013.01)

(58) Field of Classification Search
CPC .............................. H04W 72/23; H04L 1/1812
See application file for complete search history.

(56) References Cited

U.S. PATENT DOCUMENTS

2019/0289638 A1*    9/2019    Kung ................ H04W 74/0833

FOREIGN PATENT DOCUMENTS

RU          2 676 869 C2       1/2019
WO    WO-2020032530 A1 *    2/2020

OTHER PUBLICATIONS

3GPP TSG-RAN2 #102; Busan, Korea; Source: OPPO; Title: Remaining issue on flushing HARQ buffer (R2-1806877)—May 21-25, 2018.
3GPP TSG-RAN WG2 Meeting #103; Gothenburg, Sweden; Source: Huawei, HiSilicon; Title: Discussion on handling of configuredGrant-Timer during Random Access Procedure (R2-1812626)—Aug. 20-24, 2018.

(Continued)

*Primary Examiner* — Elton Williams
(74) *Attorney, Agent, or Firm* — Baker Botts L.L.P.

(57) ABSTRACT

According to certain embodiments, a method performed by a wireless device comprises receiving a first grant and a second grant from a network node. The first grant and the second grant are overlapping. The method comprises pre-empting a transmission for the first grant based on prioritizing a transmission for the second grant. The method comprises controlling a timer used in a hybrid automatic repeat request (HARQ) process associated with the first grant based on pre-empting the transmission for the first grant.

22 Claims, 11 Drawing Sheets

(56) References Cited

OTHER PUBLICATIONS

3GPP TSG-RAN WG2 105; Athens, Greece; Source: Intel Corporation; Title: Configured UL grant enhancement for NR Unlicense (R2-1900719)—Feb. 25-Mar. 1, 2019.
3GPP TSG-RAN WG2 Meeting #105; Athens, Greece; Source: Huawei, HiSilicon; Title: Coexistence between configured grant and dynamic grant in NR-U (R2-1901335)—Feb. 25-Mar. 1, 2019.
3GPP TSG-RAN WG2 Meeting #105; Athens, Greece; Source: Huawei, HiSilicon; Title: Collision between Configured and Dynamic grants (R2-1901441 (Revision of R2-1817507))—Feb. 25-Mar. 1, 2019.
PCT International Search Report issued for International application No. PCT/EP2020/058376—Jun. 3, 2020.
PCT Written Opinion of the International Searching Authority issued for International application No. PCT/EP2020/058376—Jun. 3, 2020.
Official Action issued by the Federal Service for Intellectual Property (FIIP), Moscow for Application No. 2021131355/07(066458) issued Apr. 1, 2022.

* cited by examiner

CONFIGURED GRANT TIMER IN INTRA-USER EQUIPMENT MULTIPLEXING

PRIORITY

This nonprovisional application is a U.S. National Stage Filing under 35 U.S.C. § 371 of International Patent Application Serial No. PCT/EP2020/058376 filed Mar. 25, 2020 and entitled "Configured Grant Timer in Intra-User Equipment Multiplexing" which claims priority to U.S. Provisional Patent Application No. 62/825,728 filed Mar. 28, 2019 both of which are hereby incorporated by reference in their entirety.

BACKGROUND

The present disclosure is described within the context of 3rd Generation Partnership Project (3GPP) New Radio (NR) radio technology. For example, certain aspects of the present disclosure are described within the context of 3GPP Technical Specification (TS) 38.300 V15.2.0 (2018-06). Although certain examples herein are described in the context of radio access networks (RANs), network nodes (e.g., base stations, such as gNBs in NR), and user-equipments (UEs) implementing 3GPP NR access technology and standards, the problems and solutions described herein are equally applicable to RANs, network nodes, and UEs implementing other access technologies and standards. In particular, the disclosure is applicable also to 3GPP Long-Term Evolution (LTE), or 3GPP LTE and NR integration, also denoted as non-standalone NR.

The 3GPP study item RP-182090 (Revised SID: Study on NR Industrial Internet of Things (IoT)) studies NR technology enhancements with the target of providing more deterministic low-latency delivery of data. This traffic is also referred to as time sensitive networking (TSN) traffic with typically periodic packet occurrences per cycle time.

Uplink (UL) traffic can be scheduled with dynamic UL grants or configured UL grants. In the case of dynamic grants, the network node provides an UL grant to the UE for each UL transmission. In the case of configured grants, the network node pre-allocates UL grants to the UE, i.e., a configured grant is provided once to the UE. Thereafter the UE may use the configured UL grant for UL transmissions according to a configured periodicity. The UE does not need to transmit padding on those UL resources if no UL data is available for transmission, i.e., the UE may skip an UL transmission on such grants.

A typical NR Internet-of-Things (IoT) device would handle communication for multiple service types, e.g., multiple periodic Ultra-Reliable Low-Latency Communication (URLLC) type robot control messages (also referred to as time-sensitive networking (TSN)-like traffic), URLLC type of occasional alarm signals (for which periodic resources would need to be configured or relying on UE to send scheduling request for each occasional alarm message), occasional sensor data transmission (can be time-critical or non-time-critical), other Enhanced Mobile Broadband (eMBB) or Mobile Broadband (MBB) best-effort type traffic such as occasional video transmissions or software updates. This would lead to a mix of traffic to be multiplexed by the UE for UL transmissions, i.e., multiple logical channels with different priorities would need to be configured on Medium Access Control (MAC). In such a mixed traffic scenario, it is crucial to treat the URLLC-type of traffic with high priority.

The 3GPP study from RP-182090 concluded that it would be beneficial to support enhanced prioritization between different intra-UE traffic types and priorities. In the follow-up work item RP-190728, the detailed objectives for NR intra-UE prioritization/multiplexing are:
Specify enhancements to address resource conflicts between dynamic grant (DG) and configured grant (CG) physical uplink shared channel (PUSCH) and conflicts involving multiple CGs [RAN2, RAN1].
Specify PUSCH grant prioritization based on logical channel (LCH) priorities and logical channel prioritization (LCP) restrictions for the cases where MAC prioritizes the grant [RAN2].

SUMMARY

There currently exist certain challenges. As discussed above, there are two type of uplink grants, i.e., dynamic grants and configured grants. These grants can be allocated to either URLLC traffic or eMBB traffic, and the eMBB/URLLC traffic can be periodic or a-periodic. The need to support multiple periodic URLLC flows where each flow is served by one configured grant further complicates matters. In conclusion, there are many possibilities that the allocated dynamic and/or configured grants might overlap. An overall framework to treat all these cases does not exist. Mere guidelines to focus on LCP restrictions when specifying those decisions as provided in 3GPP are not sufficient to address these challenges. As one example, it is unclear how the UE employing LCP decides to select among multiple available grants. In particular, it is unclear how the UE employing LCP decides whether or not to pre-empt an already ongoing transmission according to one of the grants by another grant. Additionally, one issue not addressed in previous solutions is the operation of a timer associated with a configured grant.

Certain aspects of the present disclosure and their embodiments may provide solutions to these or other challenges. For example, certain embodiments enable a wireless device to determine when to pre-empt a transmission based on a later received overlapping grant. As discussed in the present disclosure, certain embodiments may allow a UE to enhance the resource utilization of the pre-emption mechanism. For instance, if the pre-empted data was multiplexed into the pre-empting grant, the Hybrid Automatic Repeat Request (HARQ) process of the pre-empted grant should be freed. Hence, a new initial transmission should be enabled without the need to wait for the expiration ConfiguredGrantTimer, since the pre-empted data is not handled via other HARQ process. Accordingly, the present disclosure may provide certain techniques for addressing the operational issues of using a timer, such as ConfiguredGrantTimer, resulting from overlapping grants prioritization/multiplexing procedures.

There are, proposed herein, various embodiments which address one or more of the issues disclosed herein.

According to certain embodiments, a method performed by a wireless device comprises receiving a first grant and a second grant from a network node. The first grant and the second grant are overlapping. The method comprises pre-empting a transmission for the first grant based on prioritizing a transmission for the second grant. The method comprises controlling a timer used in a HARQ process associated with the first grant based on pre-empting the transmission for the first grant.

According to certain embodiments, a wireless device comprises power supply circuitry and processing circuitry.

The power supply circuitry is configured to supply power to the wireless device. The processing circuitry is configured to receive a first grant and a second grant from a network node. The first grant and the second grant are overlapping. The processing circuitry is configured to pre-empt a transmission for the first grant based on prioritizing a transmission for the second grant. The processing circuitry is configured to control a timer used in a HARQ process associated with the first grant based on pre-empting the transmission for the first grant.

According to certain embodiments, a computer program comprises instructions that, when executed on a computer, cause the computer to perform a method comprising receiving a first grant and a second grant from a network node, wherein the first grant and the second grant are overlapping, pre-empting a transmission for the first grant based on prioritizing a transmission for the second grant, and controlling a timer used in a HARQ process associated with the first grant based on pre-empting the transmission for the first grant.

Each of the above-described method performed by a wireless device, wireless device, and/or computer program may comprise one or more additional features, such as one or more of the following:

Certain embodiments perform the transmission for the second grant and perform the transmission for the first grant after performing the transmission for the second grant. In certain embodiments, controlling the timer comprises starting or restarting the timer when the transmission for the first grant is performed. In certain embodiments, restarting the timer comprises resetting a timer value, thereby increasing a time period for performing the HARQ process.

In certain embodiments, the transmission for the first grant comprises first data, the transmission for the second grant comprises second data, and none of the first data is multiplexed with the second data.

Certain embodiments receive a retransmission allocation for the HARQ process associated with the first grant. The retransmission allocation is received from the network node prior to expiry of the timer. Certain embodiments perform a retransmission of data for the HARQ process associated with the first grant. Certain embodiments restart the timer in connection with performing the retransmission.

Certain embodiments flush a buffer for the HARQ process associated with the first grant after expiry of the timer.

In certain embodiments, pre-empting the transmission for the first grant comprises stopping the wireless device from transmitting a MAC PDU previously constructed for the first grant.

In certain embodiments, the first grant comprises a configured grant indicating uplink resources that are available for use by the wireless device on a periodic basis.

In certain embodiments, the timer is a configured grant timer.

According to certain embodiments, a method performed by a network node comprises sending a first grant and a second grant to a wireless device. The first grant and the second grant are overlapping. The method comprises receiving a transmission for the first grant from the wireless device. The transmission for the first grant comprises a transmission that was previously pre-empted by a transmission for the second grant. The method comprises determining an expected expiration of a timer used by the wireless device in a HARQ process associated with the first grant.

According to certain embodiments, a network node comprises power supply circuitry and processing circuitry. The power supply circuitry is configured to supply power to the network node. The processing circuitry is configured to send a first grant and a second grant to a wireless device. The first grant and the second grant are overlapping. The processing circuitry is configured to receive a transmission for the first grant from the wireless device. The transmission for the first grant comprises a transmission that was previously pre-empted by a transmission for the second grant. The processing circuitry is configured to determine an expected expiration of a timer used by the wireless device in a HARQ process associated with the first grant.

According to certain embodiments, a computer program comprises instructions that, when executed on a computer, cause the computer to perform a method comprising sending a first grant and a second grant to a wireless device, wherein the first grant and the second grant are overlapping, receiving a transmission for the first grant from the wireless device, wherein the transmission for the first grant comprises a transmission that was previously pre-empted by a transmission for the second grant, and determining an expected expiration of a timer used by the wireless device in a HARQ process associated with the first grant.

Each of the above-described method performed by a network node, network node, and/or computer program may comprise one or more additional features, such as one or more of the following:

Certain embodiments receive a transmission for the second grant from the wireless device prior to receiving the transmission for the first grant.

Certain embodiments determine the expected expiration of the timer by determining, based on receiving the transmission for the first grant, that the wireless device has started or restarted the timer. In some embodiments, restarting the timer comprises resetting a timer value, thereby increasing a time period for performing the HARQ process.

In certain embodiments, the transmission for the first grant comprises first data, the transmission for the second grant comprises second data, and none of the first data is multiplexed with the second data.

Certain embodiments send a retransmission allocation for the HARQ process associated with the first grant. The retransmission allocation is sent to the wireless device prior to the expected expiration of the timer. Certain embodiments receive a retransmission of data for the HARQ process associated with the first grant.

Certain embodiments determine, in connection with a retransmission procedure for requesting and receiving the retransmission, that the wireless device has restarted the timer.

Certain embodiments abstain from sending a retransmission allocation for the HARQ process associated with the first grant after the expected expiration of the timer.

In certain embodiments, the first grant comprises a configured grant indicating uplink resources that are available for use by the wireless device on a periodic basis.

In certain embodiments, the timer is a configured grant timer.

Certain embodiments may provide one or more of the following technical advantages. Certain embodiments may allow the UE to use radio resources efficiently. For example, certain embodiments provide methods of multiplexing pre-empted data on the pre-empting grant that enable the full utilization of such multiplexing to enhance spectral efficiency by allowing a new transmission once the pre-empting grant is sent.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
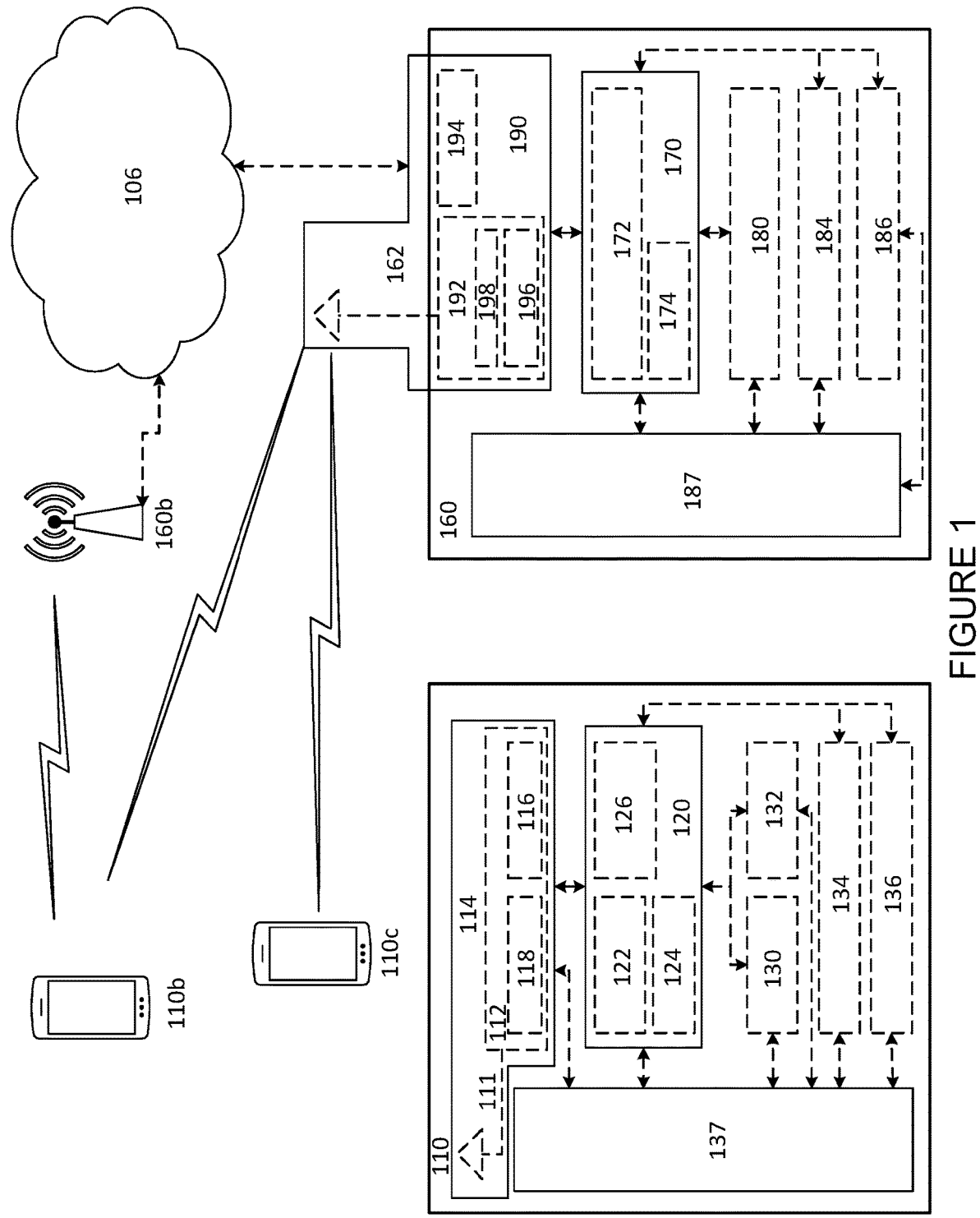
FIG. 1 illustrates an example of a wireless network in accordance with some embodiments.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Certain embodiments disclosed herein provide enhancements to the operation of certain timers used in conjunction with grants. For example, a wireless device, e.g., a UE, may use a timer called ConfiguredGrantTimer as part of a HARQ process. In general, a HARQ process may include the UE sending a transmission to a network node and starting or restarting the ConfiguredGrantTimer. If the network node fails to successfully receive data included in the transmission, the network node sends the UE a negative acknowledgement (NACK) as HARQ feedback. The NACK may be sent explicitly or implicitly, depending on the embodiment. As an example, in certain embodiments, the network node may send the wireless device a retransmission grant that serves as a form of implicit NACK. The UE may then retransmit data from the HARQ buffer. If the ConfiguredGrantTimer expires without receiving any NACK from the network node, the UE may assume that the network node successfully received the transmission. The UE may then flush the HARQ buffer and proceed with another transmission.

As discussed above, the operation of such timers in the situation of overlapping grant scenarios is not defined and may lead to wasted resources or unnecessary delays in requesting additional UL resources. Accordingly, the present disclosure discloses embodiments that enhance the ConfiguredGrantTimer operation under overlapping grant scenarios, e.g., in a UE Medium Access Control (MAC) entity.

A scenario is considered where multiple UL grants with overlapping resources are available in the UE. The UL grants can be configured UL grants or dynamic UL grants in any combination. Two cases are differentiated:

1) The MAC Protocol Data Unit (PDU) has not been built or can be re-built, when a second UL grant is received and processed. This can happen in the case that the knowledge of overlapping grants and their respective user data is available for processing in MAC before construction of the MAC PDU is initiated or before submission to lower layers (i.e., the MAC has enough time prior to transmission start to decide what data to prioritize and construct or re-construct the corresponding MAC PDU). This can also happen in the case where new data for a grant becomes available when a MAC PDU corresponding to another previous grant has been submitted to the physical layer for transmission, but for where the transmission has not yet started, and it is possible to re-build that MAC PDU.

2) The MAC PDU of a pre-empted transmission has been built and submitted and therefore cannot be re-built (e.g., the transmission has started), when a second UL grant is received and processed.

According to certain embodiments, when the UE receives an UL grant and there is an overlap of resources with a previously received grant, the UE may select among the grants according to certain rules or configured specifications. Among those rules are:

If both grants are of type dynamic grant, the later grant is selected.

Else, the grant is selected according to a grant selection procedure, in which one of the grants is selected based on which type of resources the data of the logical channel with the highest priority is allowed to be transmitted on, thereby considering logical channel transmission restrictions, e.g., on grant type, duration, reliability, etc. Accordingly, the UE selects the grant associated with the highest priority LCHs.

Else, if both grants and associated LCHs are of the same priority, then the UE may select the grant with the largest transport block size (TBS).

According to certain embodiments, it is possible to multiplex a pre-empted MAC PDU's data on the pre-empting grants using rules such as, LCP restrictions and LCH prioritization. For example, even if a MAC PDU has been constructed for an earlier grant and sent to the physical layer (PHY), it may be pre-empted by a later-received overlapping grant. According to certain embodiments, the UE may pre-empt the already constructed MAC PDU and build a new MAC PDU based on the new grant. In some embodiments, some of the data that was intended for pre-empted grant may be multiplexed with the data for the newly received grant. Note that if the data on the first pre-empted grant has been fully multiplexed on the new pre-empting grant, the ConfiguredGrantTimer and HARQ buffer of the pre-empted grant will prevent the UE from sending a new transmission on that HARQ process unless the timer is stopped (and the buffer is flushed). For example, since no HARQ feedback is sent for the pre-empted data because it was fully multiplexed with the data for the new grant and this new transmission may occur before the ConfiguredGrantTimer has expired, the UE may refrain from sending a new transmission. The below disclosure describes certain embodiments to reduce this wasted time period in the event of pre-emption.

According to a first set of embodiments, if a configured grant was pre-empted by another grant, and the pre-empted data was multiplexed into the pre-empting grant, the configuredGrantTimer of the pre-empted grant's HARQ Process ID (PID) should be stopped. As a result, new transmissions using that HARQ process are allowed.

In certain embodiments, if only part of the pre-empted data was multiplexed in the pre-empting grant, the pre-empted grant's ConfiguredGrantTimer may still be stopped. Then, the remaining data form this pre-empted HARQ process may be re-considered as all other LCHs data for new transmissions in LCP.

In certain embodiments, if only part of the pre-empted data was multiplexed in the pre-empting grant, the pre-empted grant's ConfiguredGrantTimer should not be stopped, and MAC entity triggers retransmission procedures for the pre-empted HARQ process.

The associated HARQ process buffer may be flushed, in certain embodiments, to enable storing data for a new transmission, multiplexed from LCHs.

In the case where the pre-empting grant is used transmitting new data without multiplexing the pre-empted data on it, the pre-empted HARQ process grant timer (ConfiguredGrantTimer) is kept running until it expires or is restarted, e.g., in response to receiving a retransmission allocation from the network node.

The timer may be restarted for the configured grant when the pre-emption is detected, effectively prolonging the timer value, according to certain embodiments. For example, if no data from the pre-empted grant or only some data from the pre-empted grant is multiplexed with the data in the pre-empting grant, then the timer may be restarted to ensure that sufficient time is given for the UE to transmit this pre-empted data, e.g., in the next available transmission slot according to the pre-empted grant.

Certain embodiments of the present disclosure may build on methods and apparatuses described in U.S. Patent Application 62/805,906, entitled "Multiple Grant Handling in Mixed Services Scenarios" and U.S. Patent Application 62/825,224, entitled "Logical Channel Prioritization for Pre-Emption," the contents of which are hereby incorporated by reference. For example, certain embodiments may build on methods and apparatuses that use selection rules for selecting between overlapping grants. Certain embodiments may build on methods and apparatuses that multiplex the pre-empted data on the pre-empting grant in order to fully utilize the resources of the pre-empting grant.

Although the subject matter described herein may be implemented in any appropriate type of system using any suitable components, the embodiments disclosed herein are described in relation to a wireless network, such as the example wireless network illustrated in FIG. 1. For simplicity, the wireless network of FIG. 1 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2nd Generation (2G), 3rd Generation (3G), 4th Generation (4G), or 5th Generation (5G) standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., mobile switching centers (MSCs), mobility management entities (MMEs)), operation and maintenance (O&M) nodes, operations support system (OSS) nodes, SON nodes, positioning nodes (e.g., evolved-serving mobile location centre (E-SMLCs)), and/or minimization of drive tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 1, network node 160 includes processing circuitry 170, device readable medium 180, interface 190, auxiliary equipment 184, power source 186, power circuitry 187, and antenna 162. Although network node 160 illustrated in the example wireless network of FIG. 1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, Wide Code Division Multiplexing Access (WCDMA), LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 1 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 2:
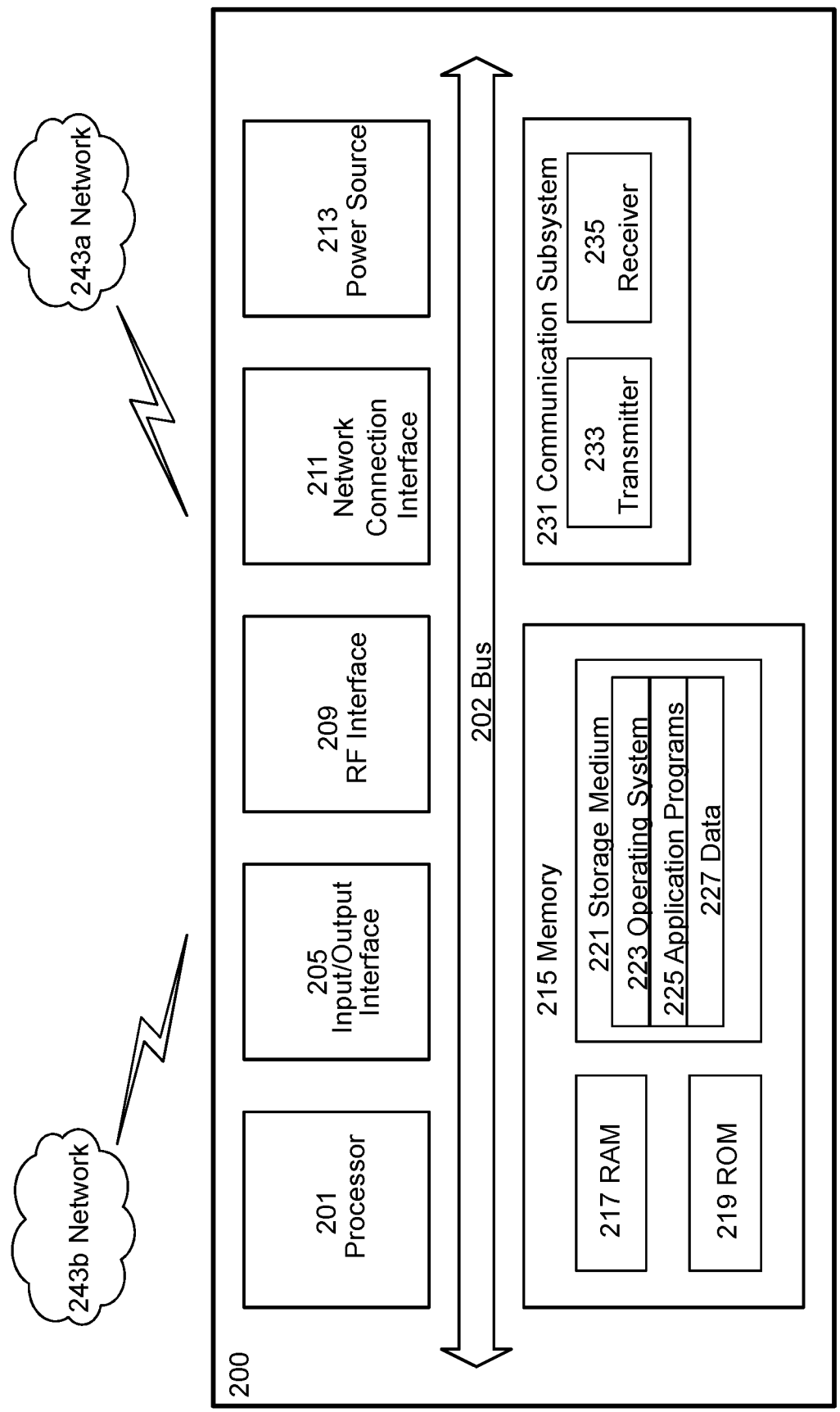
FIG. 2 illustrates an example of a User Equipment in accordance with some embodiments.

FIG. 2 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 2, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 2 is a UE, the components discussed herein are equally applicable to a WD, and vice-versa.

In FIG. 2, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 2, or only a subset of the components. The level of integration between the components may vary from one UE to another UE. Further, certain UEs may contain multiple instances of a component, such as multiple processors, memories, transceivers, transmitters, receivers, etc.

In FIG. 2, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 2, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 2, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, Universal Terrestrial Radio Access Network (UTRAN), WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 3:
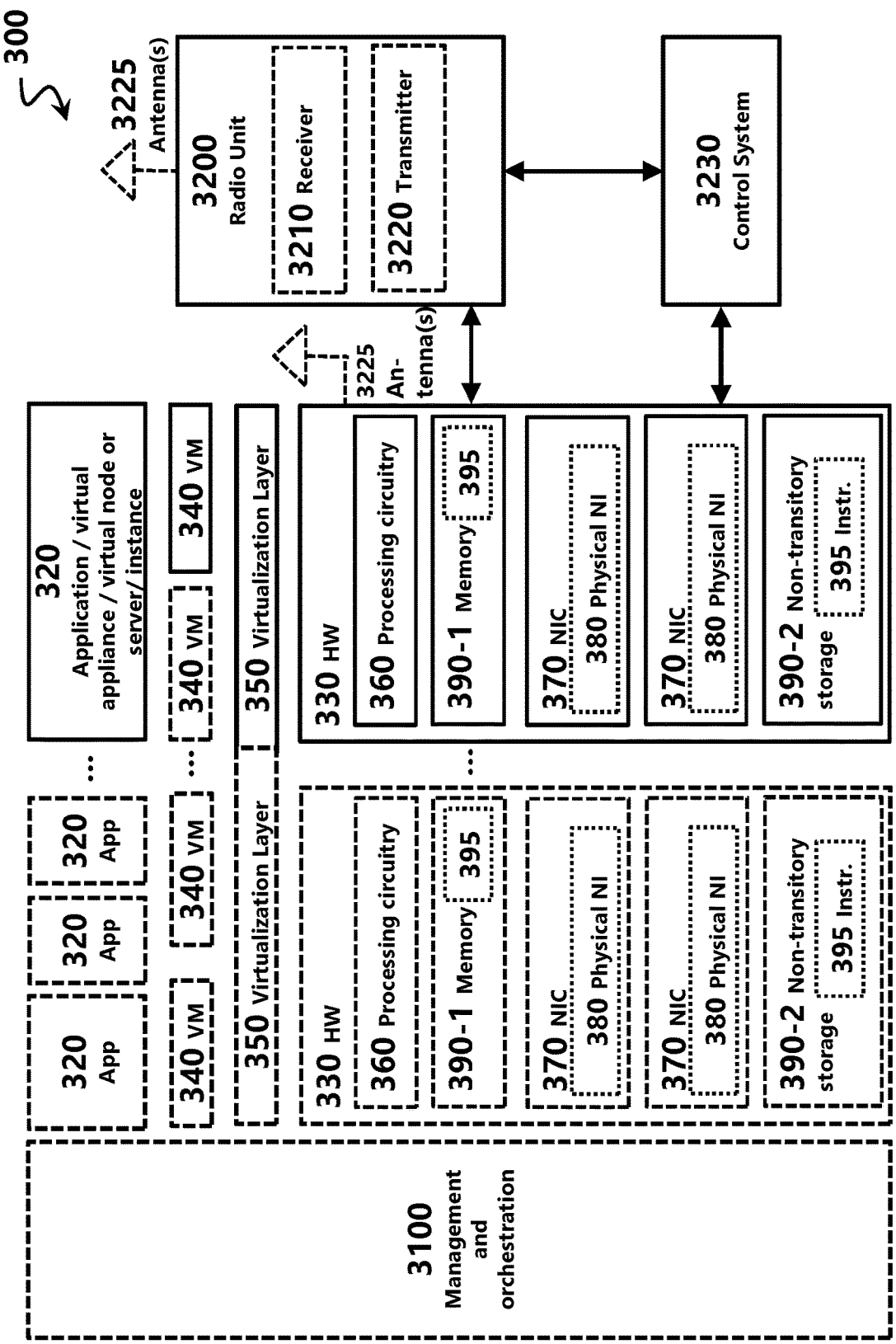
FIG. 3 illustrates an example of a virtualization environment in accordance with some embodiments.

FIG. 3 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 3, hardware 330 may be a standalone network node with generic or specific components. Hardware 330 may comprise antenna 3225 and may implement some functions via virtualization. Alternatively, hardware 330 may be part of a larger cluster of hardware (e.g., such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 3.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 4:
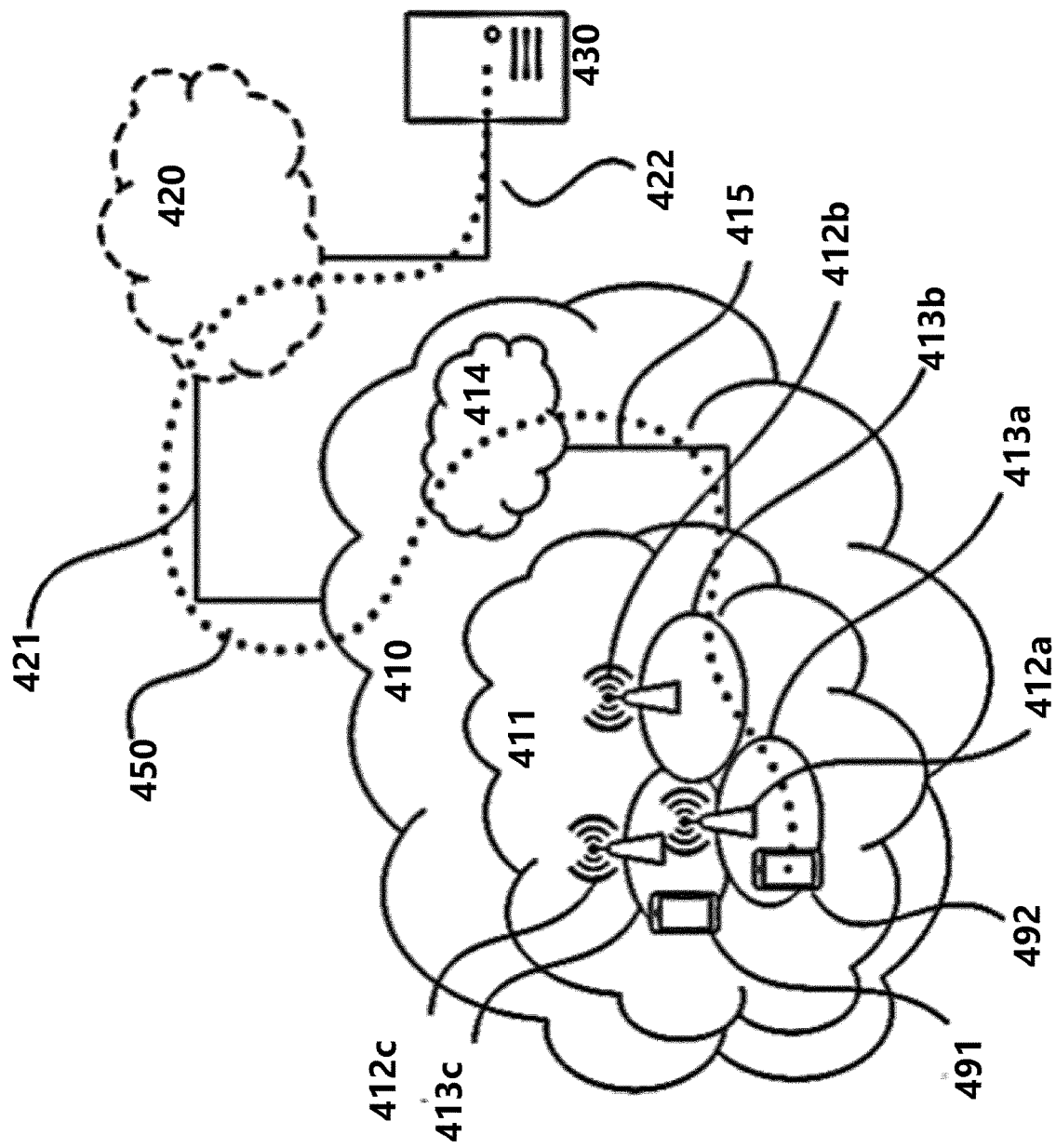
FIG. 4 illustrates an example of a telecommunication network connected via an intermediate network to a host computer in accordance with some embodiments.

With reference to FIG. 4, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 4 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 5. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 5) served by base station 520. Communication interface 526 may be configured to facilitate connection 560 to host computer 510. Connection 560 may be direct or it may pass through a core network (not shown in FIG. 5) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 5:
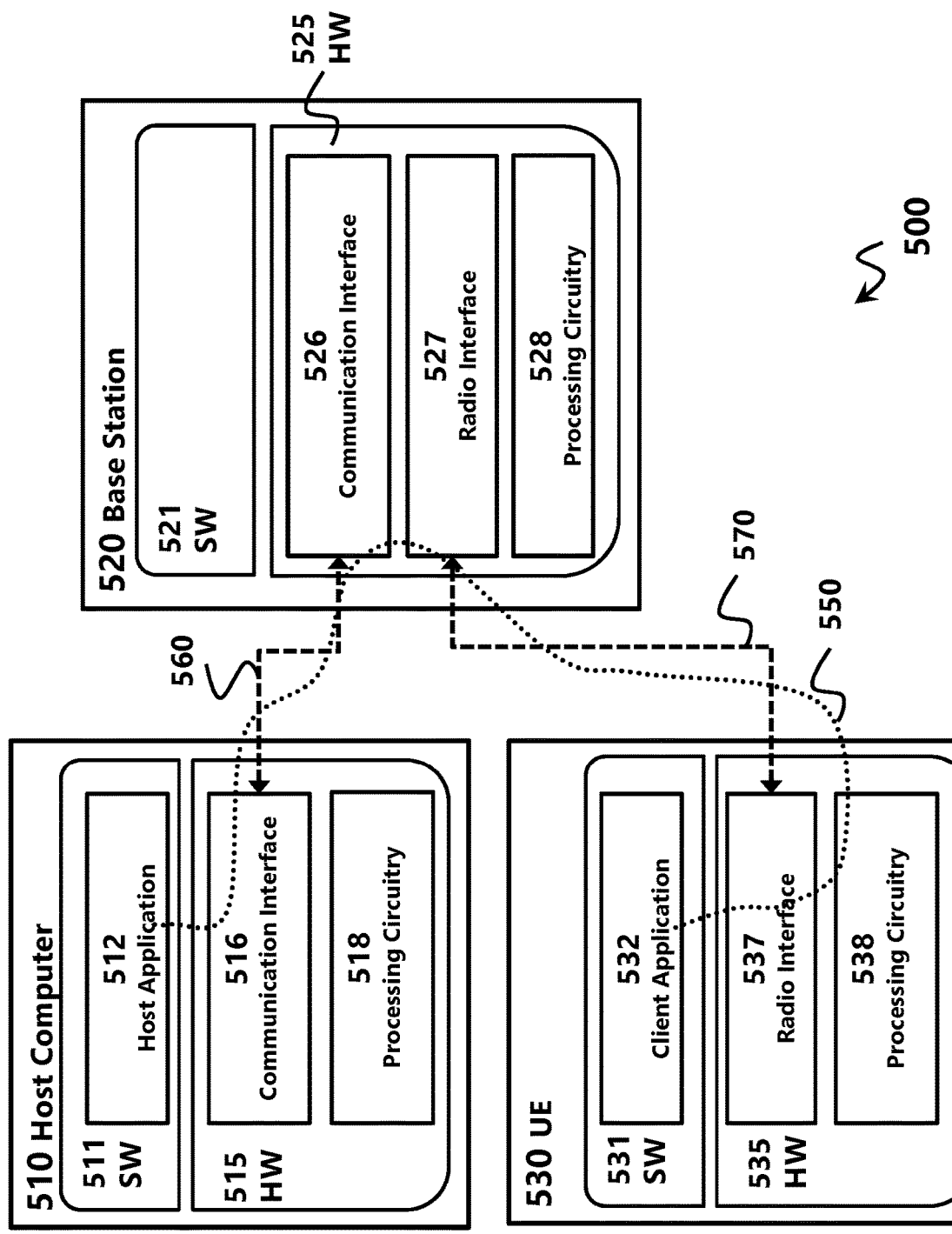
FIG. 5 illustrates an example of a host computer communicating via a base station with a user equipment over a partially wireless connection in accordance with some embodiments.

It is noted that host computer 510, base station 520 and UE 530 illustrated in FIG. 5 may be similar or identical to host computer 430, one of base stations 412a, 412b, 412c and one of UEs 491, 492 of FIG. 4, respectively. This is to say, the inner workings of these entities may be as shown in FIG. 5 and independently, the surrounding network topology may be that of FIG. 4.

In FIG. 5, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate and decrease latency and thereby provide benefits such as reduced user waiting time, relaxed restriction on file size, and better responsiveness.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 6:
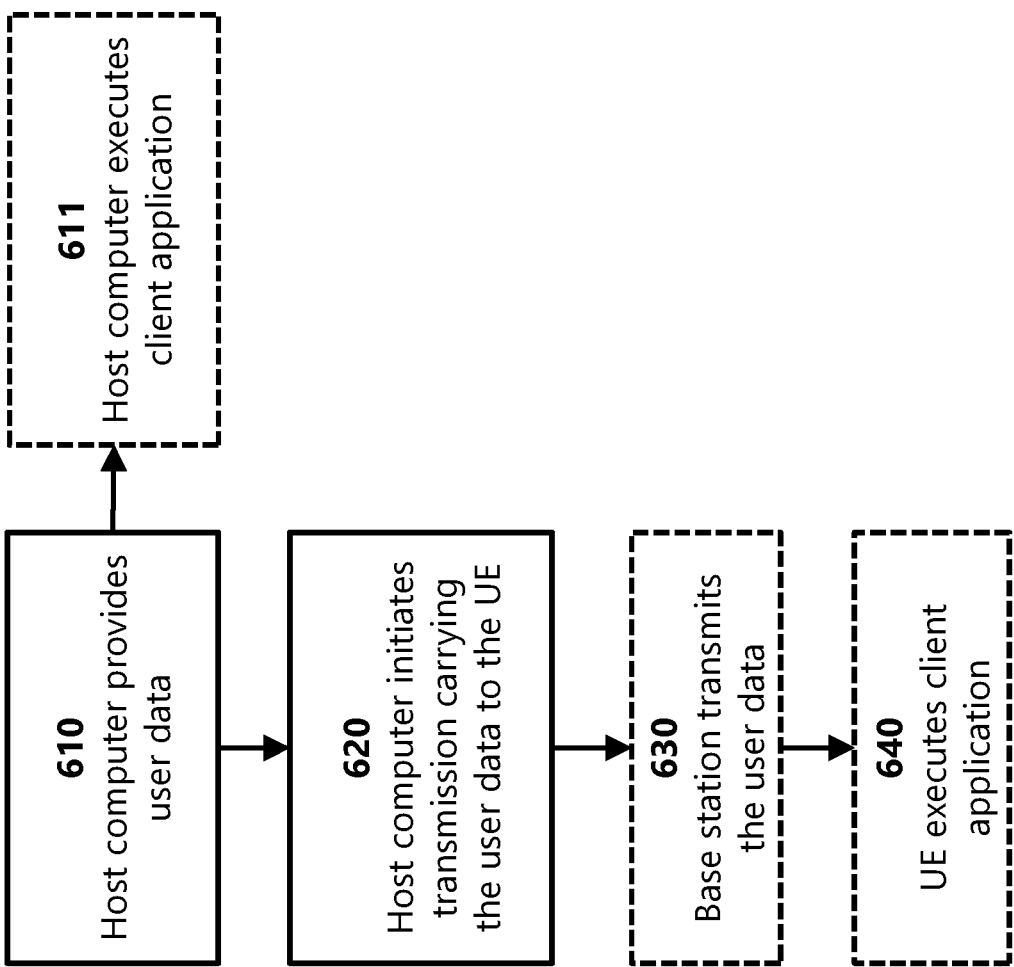
FIG. 6 illustrates an example of methods implemented in a communication system including a host computer, a base station and a user equipment in accordance with some embodiments.

FIG. 6 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 6 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 7:
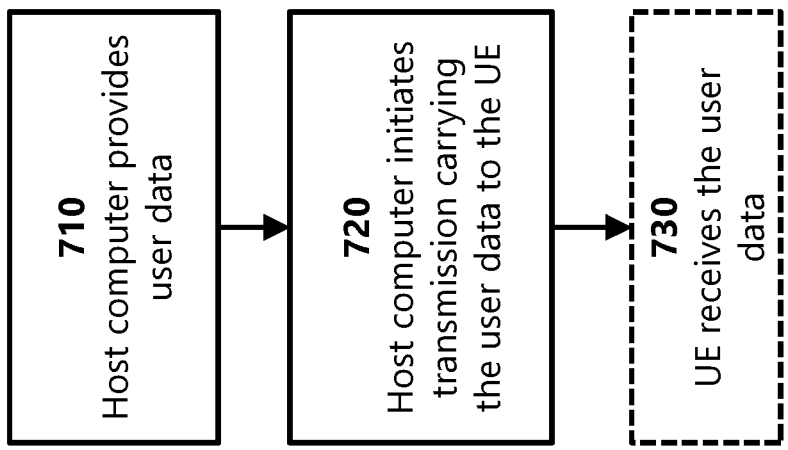
FIG. 7 illustrates an example of methods implemented in a communication system including a host computer, a base station and a user equipment in accordance with some embodiments.

FIG. 7 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 7 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 8:
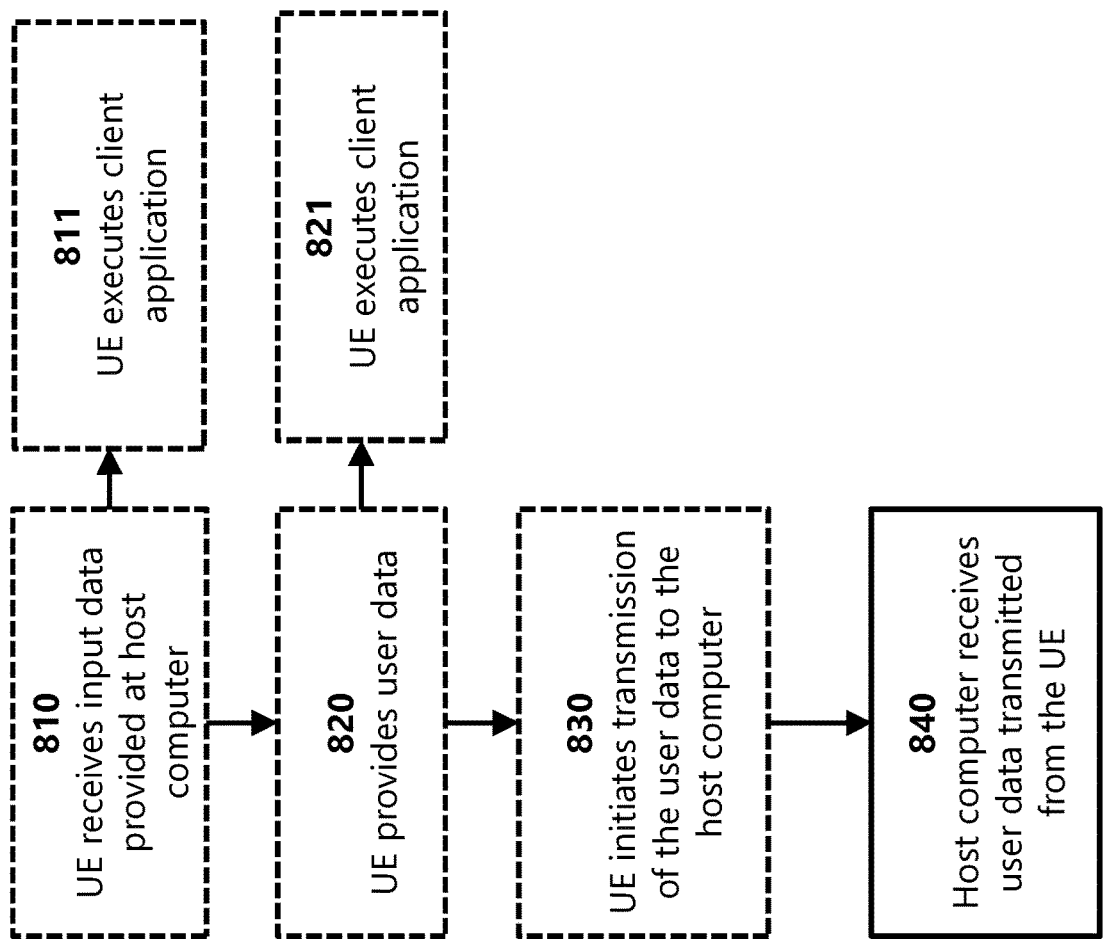
FIG. 8 illustrates an example of methods implemented in a communication system including a host computer, a base station and a user equipment in accordance with some embodiments.

FIG. 8 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 8 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 9:
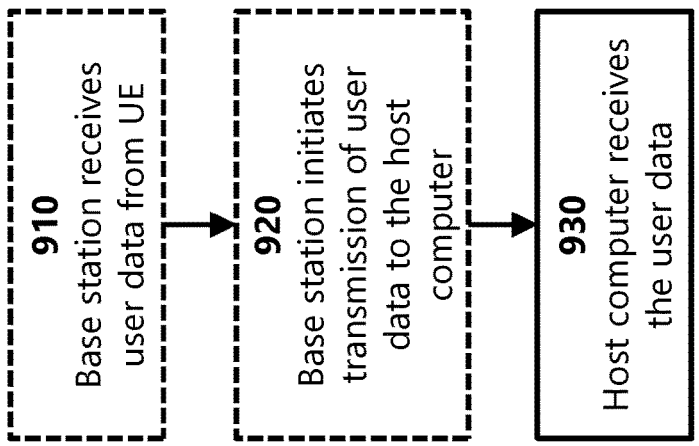
FIG. 9 illustrates an example of methods implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 9 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 10:
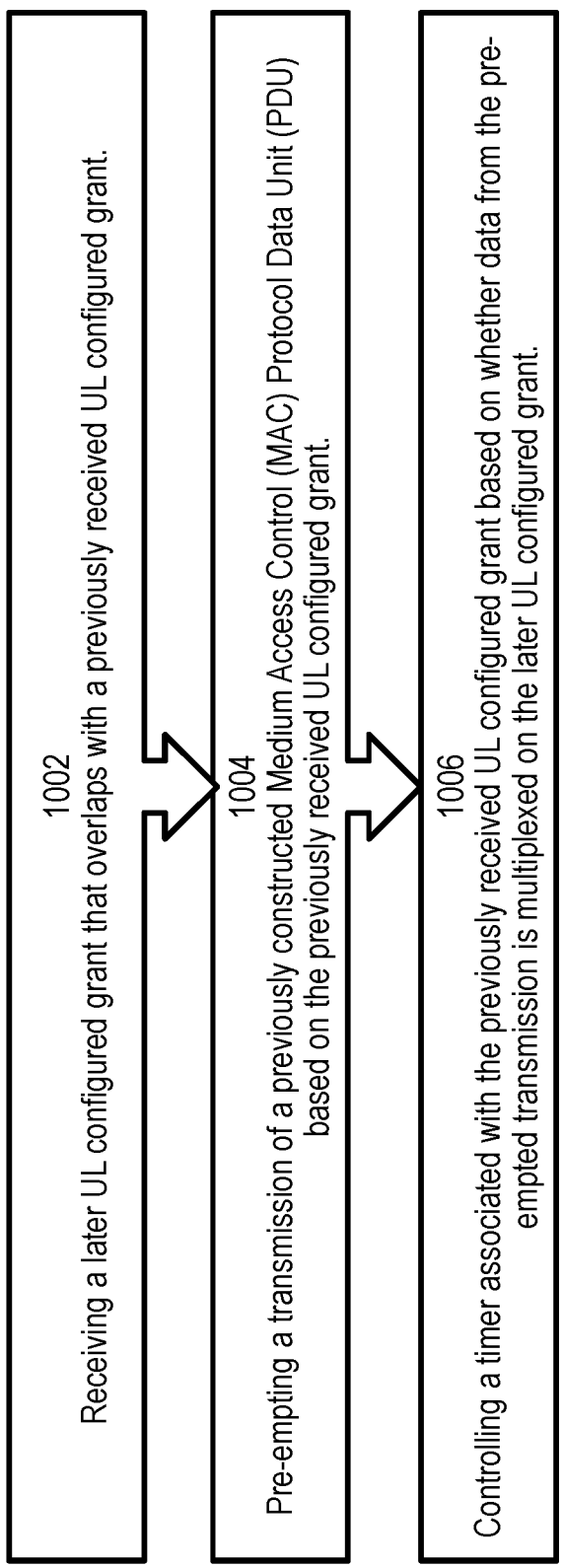
FIG. 10 illustrates an example of a method in accordance with some embodiments.

FIG. 10 depicts a method in accordance with particular embodiments, the method begins at step 1002 with receiving a later uplink (UL) configured grant that overlaps with a previously received UL configured grant. For example, a serving network node may grant a wireless device with an UL configured grant even if the wireless device has already been granted with a previous UL grant. In this case, the UL configured grants may be overlapping such that at least some of the grant resources overlap. During the overlapping instances, the wireless device may have to choose which UL grant to use. In some embodiments, the wireless device may choose to use the later-received UL configured grant despite a MAC PDU having been already constructed (and possibly sent to the physical layer for transmission).

At step 1004, the wireless device may pre-empt a transmission of the previously constructed MAC PDU based on the previously received UL configured grant. For example, the wireless device may determine to pre-empt the transmission if the later received UL configured grant has a higher priority (or data with higher priority logical channels or based on LCP). Accordingly, the wireless device may preclude the transmission of the previously-construction MAC PDU and instead use the later UL configured grant to transmit the higher priority data in a new (or rebuilt) MAC PDU.

In certain embodiments, if there is additional room in the later UL configured grant, data from the previous UL configured grant may be multiplexed with the later data. In this manner, grant resources are not wasted and there is reduced padding transmitted to the network node. However, both the previously-received UL configured grant and the later UL configured grant are associated with a timer, such as ConfiguredGrantTimer, that starts at the wireless device when they are received, respectively. The UE may control how those timers operate when the wireless device pre-empts the transmission of the previously-received UL configured grant.

At step 1006, the wireless device may control the timer associated with the previously received UL configured grant based on whether data from the pre-empted transmission is multiplexed on the later UL configured grant. For example, if all of the data from the pre-empted transmission was multiplexed, then the wireless device may stop the timer, thereby allowing the wireless device to transmit a new transmission using the HARQ process associated with the previously-received UL configured grant. In some embodiments, if at least a portion of the data from the pre-empted transmission was multiplexed, then the wireless device may stop the timer. Alternatively, the timer may not be stopped even if some of the data was multiplexed unless it is all multiplexed. According to certain embodiments, the wireless device may actually reset the timer in response to pre-empting the transmission, thereby increasing the time period before the wireless device may transmit using the associated HARQ process to allow subsequent attempts to transmit the data.

Accordingly, the example method shown in FIG. 10 may provide an enhanced control of timers associated with UL configured grants when an overlapped configured grant is pre-empted by a later-received UL grant. In particular, certain embodiments of the disclosed method may reduce unnecessary delay before a wireless device is able to transmit new transmission using a HARQ process associated with a pre-empted UL configured grant.

Figure 11:
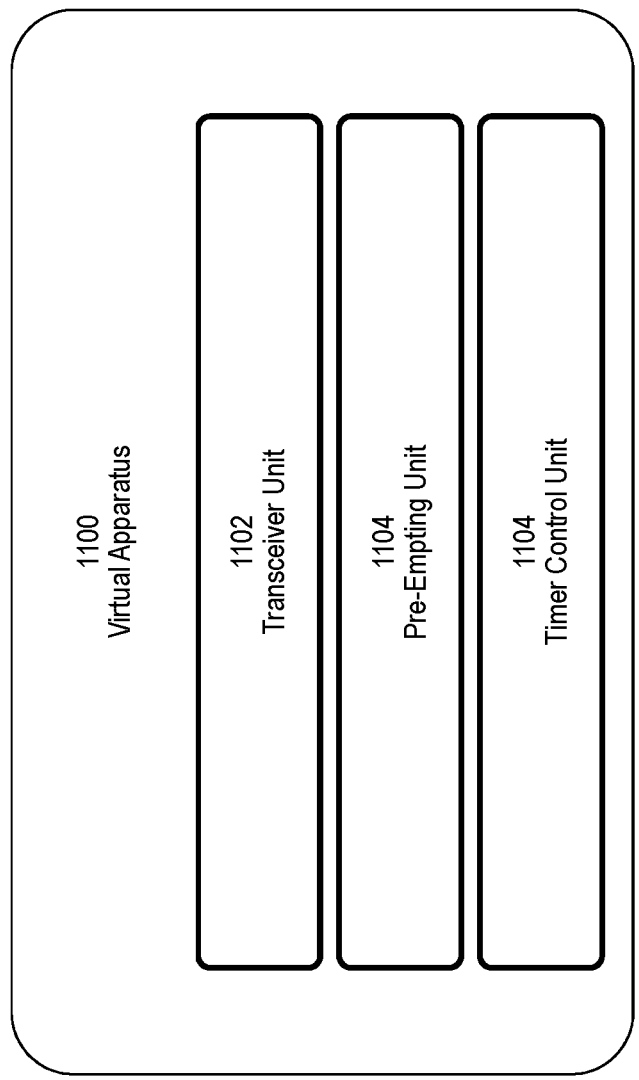
FIG. 11 illustrates an example of a virtualization apparatus in accordance with some embodiments.

FIG. 11 illustrates a schematic block diagram of an apparatus 1100 in a wireless network (for example, the wireless network shown in FIG. 1). The apparatus may be implemented in a wireless device or network node (e.g., wireless device 110 or network node 160 shown in FIG. 1). Apparatus 1100 is operable to carry out the example method described with reference to FIG. 10 and possibly any other processes or methods disclosed herein. It is also to be understood that the method of FIG. 10 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause Transceiver unit 1102, Pre-Empting unit 1104, Timer Control unit 1106, and any other suitable units of apparatus 1100 to perform corresponding functions according one or more embodiments of the present disclosure.

As illustrated in FIG. 11, apparatus 1100 includes Transceiver unit 1102, Pre-Empting unit 1104, and Timer Control unit 1106. Transceiver unit 1102 is configured to receive a later uplink (UL) configured grant that overlaps with a previously received UL configured grant. For example, a serving network node may grant a wireless device with an UL configured grant even if the wireless device has already been granted with a previous UL grant. In this case, the UL configured grants may be overlapping such that at least some of the grant resources overlap. During the overlapping instances, the wireless device may have to choose which UL grant to use. In some embodiments, the wireless device may choose to use the later-received UL configured grant despite a MAC PDU having been already constructed (and possibly sent to the physical layer for transmission).

Pre-Empting unit 1104 is configured to pre-empt a transmission of the previously constructed MAC PDU based on the previously received UL configured grant. For example, a wireless device may determine to pre-empt the transmission if the later received UL configured grant has a higher priority (or data with higher priority logical channels or based on LCP). Accordingly, the wireless device may preclude the transmission of the previously-construction MAC PDU and instead use the later UL configured grant to transmit the higher priority data in a new (or rebuilt) MAC PDU. In certain embodiments, if there is additional room in the later UL configured grant, data from the previous UL configured grant may be multiplexed with the later data.

Timer Control unit 1106 is configured to control one or more timers associated with the UL configured grants. In particular, Timer Control unit 1106 may be configured to control the timer associated with the previously received UL configured grant based on whether data from the pre-empted transmission is multiplexed on the later UL configured grant. For example, if all of the data from the pre-empted transmission was multiplexed, then the wireless device may stop the timer, thereby allowing the wireless device to transmit a new transmission using the HARQ process associated with the previously-received UL configured grant. In some embodiments, if at least a portion of the data from the pre-empted transmission was multiplexed, then the wireless device may stop the timer. Alternatively, the timer may not be stopped even if some of the data was multiplexed unless it is all multiplexed. According to certain embodiments, the wireless device may actually reset the timer in response to pre-empting the transmission, thereby increasing the time period before the wireless device may transmit using the associated HARQ process to allow subsequent attempts to transmit the data.

Accordingly, the Virtual Apparatus 1100 may provide an enhanced control of timers associated with UL configured grants when an overlapped configured grant is pre-empted by a later-received UL grant. In particular, certain embodiments of the disclosed apparatus may reduce unnecessary delay before a wireless device is able to transmit new transmission using a HARQ process associated with a pre-empted UL configured grant.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

Figure 12:
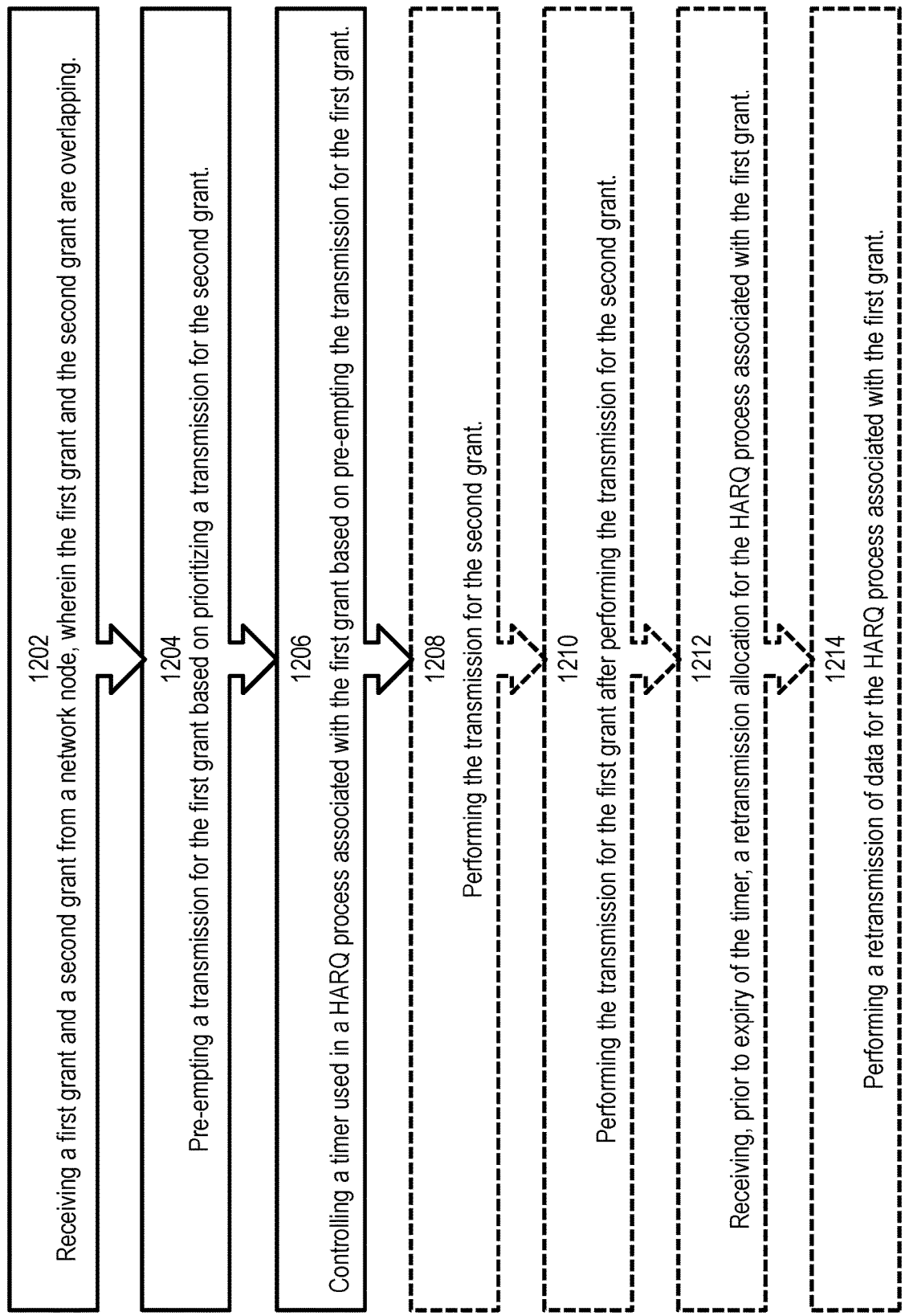
FIG. 12 illustrates an example of a method that may be performed by a wireless device in accordance with certain embodiments.

FIG. 12 illustrates an example of a method that may be performed by a wireless device in accordance with certain embodiments. Examples of a wireless device that may perform the method of FIG. 12 include wireless device 110 and UE 200 described above.

The method begins at step 1202 with receiving a first grant and a second grant from a network node. The first grant and the second grant are overlapping. The first grant may be a configured grant or a dynamic grant. Similarly, the second grant may be a configured grant or a dynamic grant. As an example, in certain embodiments, the first grant may be a configured grant and the second grant may be a dynamic grant. As discussed above, a configured grant may indicate uplink resources that are available for use by the wireless device on a periodic basis.

At step 1204, the method pre-empts a transmission for the first grant. For example, the transmission for the first grant may be pre-empted based on prioritizing a transmission for the second grant. In certain embodiments, the transmission for the first grant comprises first data, the transmission for the second grant comprises second data, and none of the first data is multiplexed with the second data. In certain embodiments, pre-empting the transmission for the first grant comprises stopping the wireless device from transmitting a MAC PDU previously constructed for the first grant.

At step 1206, the method controls a timer used in a HARQ process associated with the first grant. The timer is controlled based on pre-empting the transmission for the first grant. In certain embodiments, the timer is a configured grant timer (e.g., ConfiguredGrantTimer). Examples of controlling the timer include starting the timer or restarting the timer. In certain embodiments, restarting the timer may add time to a timer that has been started, thereby increasing a time period for performing the HARQ process. For example, restarting the timer may comprise resetting a timer value. As an example, suppose the timer starts at first value (e.g., 10 seconds) and expires when it reaches a second value (e.g., 0 seconds). If the timer has been started and has not reached the second value (e.g., the timer has reached a value in the range of 1 to 9 seconds), the timer may be restarted by resetting the timer value to the first value (e.g., 10 seconds).

In certain embodiments, the method may proceed to step 1208 with performing the transmission for the second grant, and then to step 1210 with performing the transmission for the first grant after performing the transmission for the second grant. Controlling the timer may comprise starting or restarting the timer when the transmission for the first grant is performed. As an example, suppose the duration of the transmission for the first grant is 14 symbols and the duration of the transmission for the second grant is only 2 symbols. Further suppose that the pre-emption happens at the 3rd symbol of the first grant, thereby pre-empting the transmission for the first grant on the 3rd and 4th symbols. The wireless device can resume the transmission for the first grant from the 5th symbol through the 14th symbol. The timer may be started/restarted when the transmission is performed. Continuing with the example scenario, an example of controlling the timer used in the HARQ process associated with the first grant based on pre-empting the transmission for the first grant (step 1206) may comprise starting/restarting the timer in the 2nd symbol if the wireless device does not resume the transmission such that the transmission ends in the 2nd symbol. Or, another example of controlling the timer used in the HARQ process associated with the first grant based on pre-empting the transmission for the first grant (step 1206) may comprise starting/restarting the timer in the 14th symbol if the wireless device resumes the transmission such that the transmission ends in the 14th symbol.

In certain embodiments, the method comprises step 1212 in which the method receives a retransmission allocation for the HARQ process associated with the first grant. The retransmission allocation is received from the network node prior to expiry of the timer. The retransmission allocation may be a form of implicit NACK feedback indicating that the network node did not successfully receive the transmission for the first grant. In response, the method may proceed to step 1214 with performing a retransmission of data for the HARQ process associated with the first grant. For example, because the retransmission allocation was received prior to expiry of the timer, the data for the HARQ process may be retained in an associated HARQ buffer and available for retransmission. The method may restart the timer in connection with performing the retransmission. This may increase the amount of time that the data is retained in the associated HARQ buffer in case further retransmission is required.

The timer may expire sometime after a transmission (or retransmission), for example, if an event triggering timer restart does not occur while the timer is running. After expiry of the timer, the method may flush the buffer for the HARQ process associated with the first grant. Flushing the buffer makes room in the buffer for new data. The wireless device may determine that it can flush the buffer and make room for new data based on the timer expiry because the absence of a retransmission allocation/NACK during the running time of the timer suggests that the network node successfully received the transmission such that the wireless device no longer needs to retain the old HARQ data for a possible retransmission.

As a further example, in certain embodiments, the wireless device cannot send new data on a configured grant when the timer is running. The network node can send a dynamic grant overlapping with the configured grant, and use the same HARQ process ID. In this case, the wireless device should restart the timer, since it is possible that the timer has not been stopped.

Figure 13:
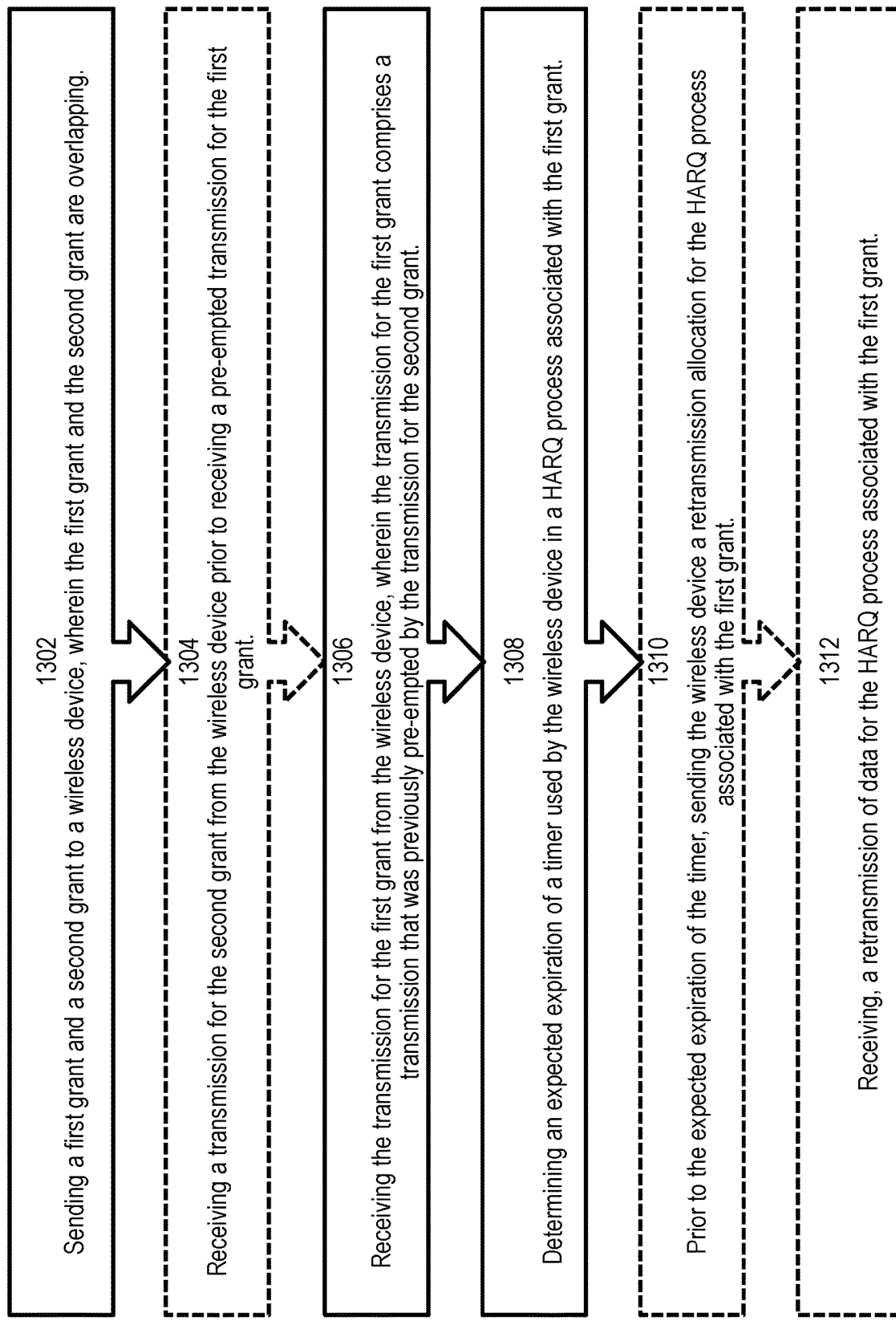
FIG. 13 illustrates an example of a method that may be performed by a network node in accordance with certain embodiments.

In certain embodiments, a network node, such as network node 160 may perform methods reciprocal to the above-described methods performed in a wireless device (or methods that otherwise support or facilitate the above-described methods performed by the wireless device). FIG. 13 illustrates an example of a method that may be performed by a network node, such as network node 160, in accordance with certain embodiments.

At step 1302, the method sends a first grant and a second grant to a wireless device. The first grant and the second grant are overlapping. The first grant may be a configured grant or a dynamic grant. Similarly, the second grant may be a configured grant or a dynamic grant. As an example, in certain embodiments, the first grant may be a configured grant and the second grant may be a dynamic grant. As discussed above, a configured grant may indicate uplink resources that are available for use by the wireless device on a periodic basis.

As discussed above with respect to FIG. 12, the wireless device may pre-empt a transmission for a first grant based on prioritizing a transmission for the second grant. From the network node perspective, certain embodiments receive the transmission for the second grant from the wireless device prior to receiving the transmission for the first grant, as shown in step 1304. As an example, suppose the duration of the transmission for the first grant is 14 symbols and the duration of the transmission for the second grant is only 2 symbols. Further suppose that the pre-emption happens at the 3rd symbol of the first grant, thereby pre-empting the transmission for the first grant on the 3rd and 4th symbols. The wireless device can resume the transmission for the first grant from the 5th symbol through the 14th symbol. In this manner, the network node receives the transmission for the second grant before receiving the complete transmission for the first grant. In certain embodiments, the transmission for the first grant comprises first data, the transmission for the second grant comprises second data, and none of the first data is multiplexed with the second data.

At step 1306, the method performed by the network node comprises receiving the transmission for the first grant from the wireless device (i.e., the transmission that was previously pre-empted by the transmission for the second grant in step 1304). The method proceeds to step 1308 with determining an expected expiration of a timer used by the wireless device in a HARQ process associated with the first grant. In certain embodiments, the timer may be a configured grant timer. Since the network node receives an overlapping transmission from the pre-empting grant, the network node is aware of the pre-emption and expects the wireless device to have started/restarted the timer as a result. That is, determining the expected expiration of the timer may comprise determining, based on receiving the transmission for the first grant, that the wireless device has started or restarted the timer. In certain embodiments, restarting the timer comprises resetting a timer value, thereby increasing a time period for performing the HARQ process (e.g., the network node may expect the wireless to perform the behaviour described with respect to step 1206 of FIG. 12).

In certain embodiments, such as when the network node fails to successfully receive the transmission for the first grant, the method may further comprise sending a retransmission allocation for the HARQ process associated with the first grant. The retransmission allocation is sent to the wireless device prior to the expected expiration of the timer. The method may then proceed to step 1312 with receiving a retransmission of data for the HARQ process associated with the first grant. In certain embodiments, in connection with the retransmission procedure for requesting and receiving the retransmission, the method may determine that the wireless device has restarted the timer. After the expected expiration of the timer, the method may abstain from sending a retransmission allocation for the HARQ process associated with the first grant. In this manner, the network node may use the expected expiration of the timer to determine when the wireless device is expected to have flushed the HARQ buffer/whether retransmissions are expected to be possible (e.g., based on the behaviour of the wireless device described above with respect to steps 1212-1214 of FIG. 12).

EMBODIMENTS

Group A Embodiments

1. A method performed by a wireless device, the method comprising:
   receiving a later UL configured grant that overlaps with a previously received UL configured grant;
   pre-empting a transmission of a previously constructed Medium Access Control (MAC) Protocol Data Unit (PDU) based on the previously received UL configured grant; and
   controlling a timer associated with the previously received UL configured grant based on whether data from the pre-empted transmission is multiplexed on the later UL configured grant.
2. The method of the previous embodiment, further comprising multiplexing data from the pre-empted transmission on the later UL configured grant.
3. The method of any of the previous embodiments, wherein controlling the timer comprises turning off the timer if the data from the pre-empted transmission is fully multiplexed on the later UL configured grant.
4. The method of any of the previous embodiments, wherein controlling the timer comprises turning off the timer if at least a portion of the data from the pre-empted transmission is multiplexed on the later UL configured grant.

5. The method of the previous embodiment, further comprising reconsidering the data from the pre-empted transmission that was not multiplexed on the later UL configured grant for subsequent transmission.
6. The method of any of the previous embodiments, wherein controlling the timer comprises continuing the timer if less than all of the data from the pre-empted transmission is multiplexed on the later UL configured grant.
7. The method of the previous embodiment, further comprising triggering retransmission procedures for the pre-empted HARQ process.
8. The method of any of the previous embodiments, further comprising flushing the a HARQ process buffer.
9. The method of any of the previous embodiments, wherein controlling the timer comprises continuing the timer if none of the data from the pre-empted transmission is multiplexed on the later UL configured grant.
10. The method of any of the previous embodiments, further comprising restarting the timer in response to pre-empting the transmission.
11. The method of any of the previous embodiments, wherein the timer is a ConfiguredGrantTimer that began when the previously received UL configured grant was received and is associated with the HARQ process for that UL configured grant.
12. The method of any of the previous embodiments, further comprising:
constructing the MAC PDU based on the previously received UL configured grant; and
sending the constructed MAC PDU to the physical layer (PHY) prior to receiving the later UL configured grant.
13. The method of any of the previous embodiments, further comprising:
providing user data; and
forwarding the user data to a host computer via the transmission to the base station.

Group B Embodiments

14. A method performed by a base station, the method comprising:
providing a later UL configured grant to a wireless device that overlaps with a previous UL configured grant to the wireless device;
receiving a transmission of data using the later UL configured grant from the wireless device; and
receiving a new transmission on a HARQ process associated with the previous UL configured grant prior to an expected expiration of a timer associated with the HARQ process and prior to HARQ feedback from the base station for that HARQ process.
15. The method of the previous embodiment, wherein the transmission of data using the later UL configured grant comprises multiplexed data associated with the previous UL configured grant.
16. The method of any of the previous embodiments, wherein the base station receives the new transmission on the HARQ process only if data associated with the previous UL configured grant is fully multiplexed on the later UL configured grant.
17. The method of any of the previous embodiments, wherein the base station receives the new transmission on the HARQ process if at least a portion of the data associated with the previous UL configured grant is multiplexed on the later UL configured grant.
18. The method of any of the previous embodiments, wherein the timer is a ConfiguredGrantTimer that began when the previously received UL configured grant was received by the wireless device and is associated with the HARQ process for that UL configured grant.
19. The method of any of the previous embodiments, further comprising indicating to the wireless device how to manage a timer associated with the previous UL configured grant if a previous transmission using the previous UL configured grant is pre-empted by the later UL configured grant.
20. The method of any of the previous embodiments, further comprising:
obtaining user data; and
forwarding the user data to a host computer or a wireless device.

Group C Embodiments

21. A wireless device, the wireless device comprising:
processing circuitry configured to perform any of the steps of any of the Group A embodiments; and
power supply circuitry configured to supply power to the wireless device.
22. A base station, the base station comprising:
processing circuitry configured to perform any of the steps of any of the Group B embodiments;
power supply circuitry configured to supply power to the base station.
23. A user equipment (UE), the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.
24. A computer program, the computer program comprising instructions which when executed on a computer perform any of the steps of any of the Group A embodiments.
25. A computer program product comprising a computer program, the computer program comprising instructions which when executed on a computer perform any of the steps of any of the Group A embodiments.
26. A non-transitory computer-readable storage medium or carrier comprising a computer program, the computer program comprising instructions which when executed on a computer perform any of the steps of any of the Group A embodiments.
27. A computer program, the computer program comprising instructions which when executed on a computer perform any of the steps of any of the Group B embodiments.

28. A computer program product comprising a computer program, the computer program comprising instructions which when executed on a computer perform any of the steps of any of the Group B embodiments.
29. A non-transitory computer-readable storage medium or carrier comprising a computer program, the computer program comprising instructions which when executed on a computer perform any of the steps of any of the Group B embodiments.
30. A communication system including a host computer comprising:
  processing circuitry configured to provide user data; and
  a communication interface configured to forward the user data to a cellular network for transmission to a user equipment (UE),
  wherein the cellular network comprises a base station having a radio interface and processing circuitry, the base station's processing circuitry configured to perform any of the steps of any of the Group B embodiments.
31. The communication system of the pervious embodiment further including the base station.
32. The communication system of the previous 2 embodiments, further including the UE, wherein the UE is configured to communicate with the base station.
33. The communication system of the previous 3 embodiments, wherein:
  the processing circuitry of the host computer is configured to execute a host application, thereby providing the user data; and
  the UE comprises processing circuitry configured to execute a client application associated with the host application.
34. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the base station performs any of the steps of any of the Group B embodiments.
35. The method of the previous embodiment, further comprising, at the base station, transmitting the user data.
36. The method of the previous 2 embodiments, wherein the user data is provided at the host computer by executing a host application, the method further comprising, at the UE, executing a client application associated with the host application.
37. A user equipment (UE) configured to communicate with a base station, the UE comprising a radio interface and processing circuitry configured to performs the of the previous 3 embodiments.
38. A communication system including a host computer comprising:
  processing circuitry configured to provide user data; and
  a communication interface configured to forward user data to a cellular network for transmission to a user equipment (UE),
  wherein the UE comprises a radio interface and processing circuitry, the UE's components configured to perform any of the steps of any of the Group A embodiments.
39. The communication system of the previous embodiment, wherein the cellular network further includes a base station configured to communicate with the UE.
40. The communication system of the previous 2 embodiments, wherein:
  the processing circuitry of the host computer is configured to execute a host application, thereby providing the user data; and
  the UE's processing circuitry is configured to execute a client application associated with the host application.
41. A method implemented in a communication system including a host computer, a base station and a user equipment (UE), the method comprising:
  at the host computer, providing user data; and at the host computer, initiating a transmission carrying the user data to the UE via a cellular network comprising the base station, wherein the UE performs any of the steps of any of the Group A embodiments.
42. The method of the previous embodiment, further comprising at the UE, receiving the user data from the base station.
43. A communication system including a host computer comprising:
  communication interface configured to receive user data originating from a transmission from a user equipment (UE) to a base station,
  wherein the UE comprises a radio interface and processing circuitry, the UE's processing circuitry configured to perform any of the steps of any of the Group A embodiments.
44. The communication system of the previous embodiment, further including the UE.
45. The communication system of the previous 2 embodiments, further including the base station, wherein the base station comprises a radio interface configured to communicate with the UE and a communication interface configured to forward to the host computer the user data carried by a transmission from the UE to the base station.
46. The communication system of the previous 3 embodiments, wherein:
  the processing circuitry of the host computer is configured to execute a host application; and
  the UE's processing circuitry is configured to execute a client application associated with the host application, thereby providing the user data.
47. The communication system of the previous 4 embodiments, wherein:
  the processing circuitry of the host computer is configured to execute a host application, thereby providing request data; and
  the UE's processing circuitry is configured to execute a client application associated with the host application, thereby providing the user data in response to the request data.
48. A method implemented in a communication system including a host computer, a base station and a user equipment (UE), the method comprising:
  at the host computer, receiving user data transmitted to the base station from the UE, wherein the UE performs any of the steps of any of the Group A embodiments.
49. The method of the previous embodiment, further comprising, at the UE, providing the user data to the base station.

50. The method of the previous 2 embodiments, further comprising:
at the UE, executing a client application, thereby providing the user data to be transmitted; and
at the host computer, executing a host application associated with the client application.

51. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

52. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

53. The communication system of the previous embodiment further including the base station.

54. The communication system of the previous 2 embodiments, further including the UE, wherein the UE is configured to communicate with the base station.

55. The communication system of the previous 3 embodiments, wherein:
the processing circuitry of the host computer is configured to execute a host application;
the UE is configured to execute a client application associated with the host application, thereby providing the user data to be received by the host computer.

56. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

57. The method of the previous embodiment, further comprising at the base station, receiving the user data from the UE.

58. The method of the previous 2 embodiments, further comprising at the base station, initiating a transmission of the received user data to the host computer.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the following claims.

The invention claimed is:

1. A method performed by a wireless device, the method comprising:
receiving a first grant and a second grant from a network node, wherein the first grant and the second grant are overlapping;
pre-empting a transmission for the first grant based on prioritizing a transmission for the second grant; and
controlling a timer used in a hybrid automatic repeat request (HARQ) process associated with the first grant based on pre-empting the transmission for the first grant, wherein controlling the timer comprises starting or restarting the timer when the transmission for the first grant is performed.

2. The method of claim 1, further comprising:
performing the transmission for the second grant; and
performing the transmission for the first grant after performing the transmission for the second grant.

3. The method of claim 1, further comprising:
receiving a retransmission allocation for the HARQ process associated with the first grant, the retransmission allocation received from the network node prior to expiry of the timer; and
performing a retransmission of data for the HARQ process associated with the first grant.

4. The method of claim 3, further comprising:
restarting the timer in connection with performing the retransmission.

5. The method of claim 1, further comprising:
flushing a buffer for the HARQ process associated with the first grant after expiry of the timer.

6. The method of claim 1, wherein pre-empting the transmission for the first grant comprises stopping the wireless device from transmitting a Medium Access Control (MAC) Protocol Description Unit (PDU) previously constructed for the first grant.

7. The method of claim 1, wherein the first grant comprises a configured grant indicating uplink resources that are available for use by the wireless device on a periodic basis; and/or
wherein the timer is a configured grant timer.

8. A wireless device, the wireless device comprising:
power supply circuitry configured to supply power to the wireless device; and
processing circuitry configured to:
receive a first grant and a second grant from a network node, wherein the first grant and the second grant are overlapping;
pre-empt a transmission for the first grant based on prioritizing a transmission for the second grant; and
control a timer used in a hybrid automatic repeat request (HARQ) process associated with the first grant based on pre-empting the transmission for the first grant, wherein to control the timer, the processing circuitry is configured to start or restart the timer when the transmission for the first grant is performed.

9. The wireless device of claim 8, the processing circuitry further configured to:
perform the transmission for the second grant; and
perform the transmission for the first grant after performing the transmission for the second grant.

10. The wireless device of claim 8, the processing circuitry further configured to:
 receive a retransmission allocation for the HARQ process associated with the first grant, the retransmission allocation received from the network node prior to expiry of the timer; and
 perform a retransmission of data for the HARQ process associated with the first grant.

11. The wireless device of claim 10, the processing circuitry further configured to:
 restart the timer in connection with performing the retransmission.

12. The wireless device of claim 8, the processing circuitry further configured to:
 flush a buffer for the HARQ process associated with the first grant after expiry of the timer.

13. The wireless device of claim 8, wherein to pre-empt the transmission for the first grant, the processing circuitry is configured to stop the wireless device from transmitting a Medium Access Control (MAC) Protocol Description Unit (PDU) previously constructed for the first grant.

14. The wireless device of claim 8, wherein the first grant comprises a configured grant indicating uplink resources that are available for use by the wireless device on a periodic basis and/or;
 wherein the timer is a configured grant timer.

15. A method performed by a network node, the method comprising:
 sending a first grant and a second grant to a wireless device, wherein the first grant and the second grant are overlapping;
 receiving a transmission for the first grant from the wireless device, wherein the transmission for the first grant comprises a transmission that was previously pre-empted by a transmission for the second grant; and
 determining an expected expiration of a timer used by the wireless device in a hybrid automatic repeat request (HARQ) process associated with the first grant, wherein determining the expected expiration of the timer comprises determining, based on receiving the transmission for the first grant, that the wireless device has started or restarted the timer when the transmission for the first grant is performed.

16. The method of claim 15, further comprising:
 receiving a transmission for the second grant from the wireless device prior to receiving the transmission for the first grant.

17. The method of claim 15, further comprising:
 sending a retransmission allocation for the HARQ process associated with the first grant, the retransmission allocation sent to the wireless device prior to the expected expiration of the timer; and
 receiving a retransmission of data for the HARQ process associated with the first grant.

18. The method of claim 17, further comprising:
 determining, in connection with a retransmission procedure for requesting and receiving the retransmission, that the wireless device has restarted the timer.

19. A network node, the network node comprising:
 power supply circuitry configured to supply power to the network node; and
 processing circuitry configured to:
  send a first grant and a second grant to a wireless device, wherein the first grant and the second grant are overlapping;
  receive a transmission for the first grant from the wireless device, wherein the transmission for the first grant comprises a transmission that was previously pre-empted by a transmission for the second grant; and
  determine an expected expiration of a timer used by the wireless device in a hybrid automatic repeat request (HARQ) process associated with the first grant, wherein to determine the expected expiration of the timer the processing circuitry is configured to determine, based on receiving the transmission for the first grant, that the wireless device has started or restarted the timer when the transmission for the first grant is performed.

20. The network node of claim 19, the processing circuitry further configured to:
 receive a transmission for the second grant from the wireless device prior to receiving the transmission for the first grant.

21. The network node of claim 19, the processing circuitry further configured to:
 send a retransmission allocation for the HARQ process associated with the first grant, the retransmission allocation sent to the wireless device prior to the expected expiration of the timer; and
 receive a retransmission of data for the HARQ process associated with the first grant.

22. The network node of claim 21, the processing circuitry further configured to:
 determine, in connection with a retransmission procedure for requesting and receiving the retransmission, that the wireless device has restarted the timer.

* * * * *